United States Patent
Ishii

(10) Patent No.: US 9,589,215 B2
(45) Date of Patent: Mar. 7, 2017

(54) IMAGE FORMING APPARATUS CAPABLE OF PROPERLY REPRODUCING DESIRED SETTINGS, METHOD OF CONTROLLING THE SAME, AND STORAGE MEDIUM

(71) Applicant: CANON KABUSHIKI KAISHA, Tokyo (JP)

(72) Inventor: Yoko Ishii, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/476,085

(22) Filed: Sep. 3, 2014

(65) Prior Publication Data

US 2015/0062644 A1 Mar. 5, 2015

(30) Foreign Application Priority Data

Sep. 4, 2013 (JP) ................. 2013-182980

(51) Int. Cl.
  *G06F 3/12* (2006.01)
  *G06K 15/02* (2006.01)
  *H04N 1/00* (2006.01)

(52) U.S. Cl.
  CPC ....... *G06K 15/1806* (2013.01); *G06F 3/1204* (2013.01); *G06F 3/1257* (2013.01); *G06F 3/1258* (2013.01); *G06F 3/1285* (2013.01); *H04N 1/0097* (2013.01); *H04N 1/00917* (2013.01)

(58) Field of Classification Search
  CPC ........... G03G 15/5012; G03G 15/5016; G06K 15/1806; G06F 3/1267; G06F 3/1256; G06F 3/1285; G06F 3/1259; G06F 3/1234; G06F 3/1208
  See application file for complete search history.

(56) References Cited

U.S. PATENT DOCUMENTS

| | | | |
|---|---|---|---|
| 2007/0109586 A1* | 5/2007 | Yamada ................. | G06F 3/121 358/1.14 |
| 2009/0161140 A1* | 6/2009 | Devries ........................ | 358/1.14 |
| 2011/0002001 A1* | 1/2011 | Tokura .......................... | 358/1.14 |
| 2011/0317202 A1* | 12/2011 | Negishi ........................ | 358/1.14 |

FOREIGN PATENT DOCUMENTS

JP  2008273126 A  11/2008

* cited by examiner

*Primary Examiner* — Clayton E Laballe
*Assistant Examiner* — Ruifeng Pu
(74) *Attorney, Agent, or Firm* — Rossi, Kimms & McDowell LLP

(57) ABSTRACT

An image forming apparatus capable of properly reproducing, even when a setting operation is interrupted by a cause unintended by a user, settings desired by the user, and thereby improving the user-friendliness. In a case where a cause of interruption of a job setting operation is generated at a timing other than a predetermined timing, information on the displayed screen and information on the job settings are stored. When the cause of interruption has been removed, the stored screen information and information on job settings are read out, and the interrupted state of the job setting operation is reproduced.

16 Claims, 12 Drawing Sheets

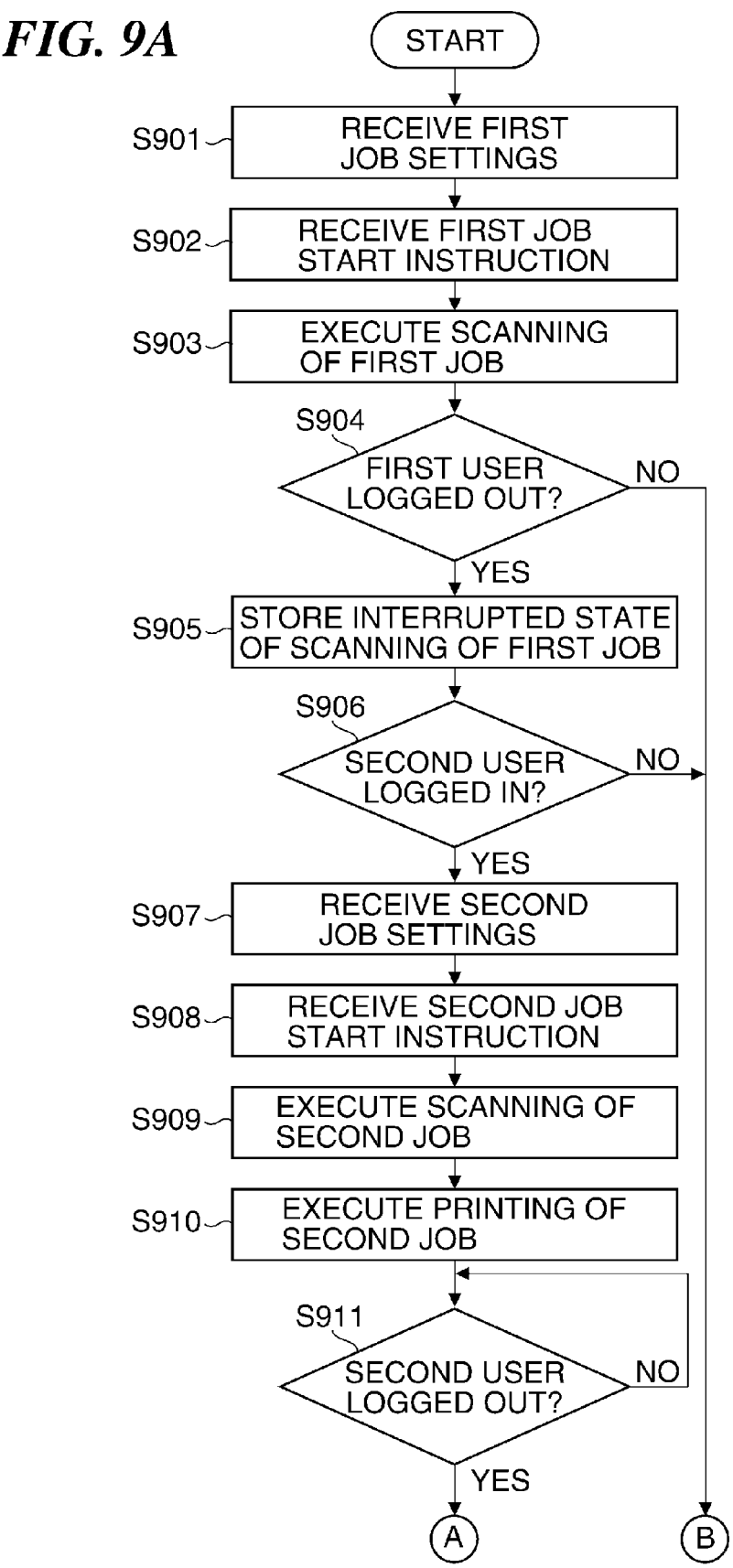

| USER | DISPLAY SCREEN | JOB SETTINGS | SCANNED IMAGE DATA |
|---|---|---|---|
| user001 | SCAN & STORE APPLICATION MODE SCREEN | PAGE AGGREGATION: 2in1 | SCANNED IMAGE DATA 1 |
| user002 | COPY BASIC SCREEN | DOUBLE-SIDED MODE: DOUBLE SIDED → DOUBLE SIDED ORIGINAL TYPE: CHARACTERS | SCANNED IMAGE DATA 2 |
| ⋮ | ⋮ | ⋮ | ⋮ |
| | | | |

1000
1001  1002  1003  1004

IMAGE FORMING APPARATUS CAPABLE OF PROPERLY REPRODUCING DESIRED SETTINGS, METHOD OF CONTROLLING THE SAME, AND STORAGE MEDIUM

BACKGROUND OF THE INVENTION

Field of the Invention

The present invention relates to an image forming apparatus, a method of controlling the same, and a storage medium, and more particularly to an image forming apparatus that is equipped with a resume function for storing settings used when the image forming apparatus was used last time, and reproducing the stored settings when the image forming apparatus is used next time.

Description of the Related Art

In recent years, an image forming apparatus is equipped with various functions, and further, the operations performed by a user have become complicated. Generally, an image forming apparatus is often shared by a plurality of users, and hence there has been proposed one equipped with an auto-clear function for automatically clearing the settings after the lapse of a predetermined time period so as to prevent, after a change in the settings, the next user from using the image forming apparatus without noticing the change in the settings. In this image forming apparatus, the user is required to select a desired setting screen from the initial menu of the image forming apparatus whenever the user uses the image forming apparatus. Therefore, even if an individual user usually uses the same settings, the user is required to perform a troublesome operation for setting the same settings every time.

To solve the above-mentioned problem, there has been proposed a customization function for enabling a user to freely configure the initial settings.

However, this function requires a user to customize the settings by himself/herself, and hence it is difficult for a user who is not familiar with the image forming apparatus to customize the settings. Therefore, a system is required, which makes it possible to automatically reproduce a screen which was used by the user last time without requiring the user's instruction.

In Japanese Patent Laid-Open Publication No. 2008-273126, when a plurality of functions are sequentially selected within a predetermined time period after user authentication, information on each of the functions and selection order thereof are stored in a manner associated with each user. Then, when customization information of the user is read from a customization information storage section, an initial display screen displayed by a function selected first (first ordinal rank) of the plurality of functions is read and displayed on a console section. By thus taking into consideration the function selection order (ordinal rank) of each of the plurality of users, it becomes possible to provide an initial display screen which is properly customized on a user-by-user basis.

In the technique disclosed in Japanese Patent Laid-Open Publication No. 2008-273126, information on each of a plurality of functions selected within a predetermined time period when the user was in a logged-in state on the immediately preceding occasion and an order of selection thereof are stored in association with each user. Further, the user can properly set "the predetermined time period in the logged-in state", and set the time period in a manner associated with timing desired by the user for storing information on the selected functions and order of election thereof, such as a time at which a job is finished, and a time at which the user logs out.

However, in a case where a setting operation is interrupted by a cause unintended by the user and it does not fall within "the predetermined time period in the logged-in state", the settings are not stored, and hence the user is required to reconfigure the settings when the cause of interruption is removed.

SUMMARY OF THE INVENTION

The present invention provides a technique that makes it possible to properly reproduce, even when a setting operation is interrupted by a cause unintended by a user, settings desired by the user, and thereby improve the user-friendliness.

In a first aspect of the present invention, there is provided an image forming apparatus comprising an operation unit configured to receive a setting operation, a storage unit configured to store information on settings made by the setting operation on the operation unit, in response to interruption of the setting operation, and a reproduction unit configured to read out the information on the settings stored in the storage unit and thereby reproduce an interrupted state of the setting operation, in response to removal of the interruption of the setting operation.

In a second aspect of the present invention, there is provided a method of controlling an image forming apparatus including an operation unit that receives a setting operation, comprising storing information on settings made by the setting operation on the operation unit, in response to interruption of the setting operation, and reading out the information on the settings stored in the storage unit and thereby reproducing an interrupted state of the setting operation, in response to removal of the interruption of the setting operation.

In a third aspect of the present invention, there is provided a non-transitory computer-readable storage medium storing a computer-executable program for executing a method of controlling an image forming apparatus including an operation unit that receives a setting operation, wherein the method comprises storing information on settings made by the setting operation on the operation unit, in response to interruption of the setting operation, and reading out the information on the settings stored in the storage unit and thereby reproducing an interrupted state of the setting operation, in response to removal of the interruption of the setting operation.

According to the present invention, even when a setting operation is interrupted by a cause unintended by the user, it is possible to properly reproduce the settings desired by the user, and thereby improve the user-friendliness.

Further features of the present invention will become apparent from the following description of exemplary embodiments (with reference to the attached drawings).

BRIEF DESCRIPTION OF THE DRAWINGS

FIG. 9A is a flowchart of a user interrupt handling process performed when an interrupt by another user is generated during execution of a job by an image forming apparatus according to a third embodiment of the present invention.

DESCRIPTION OF THE EMBODIMENTS

The present invention will now be described in detail below with reference to the accompanying drawings showing embodiments thereof.

Figure 1:
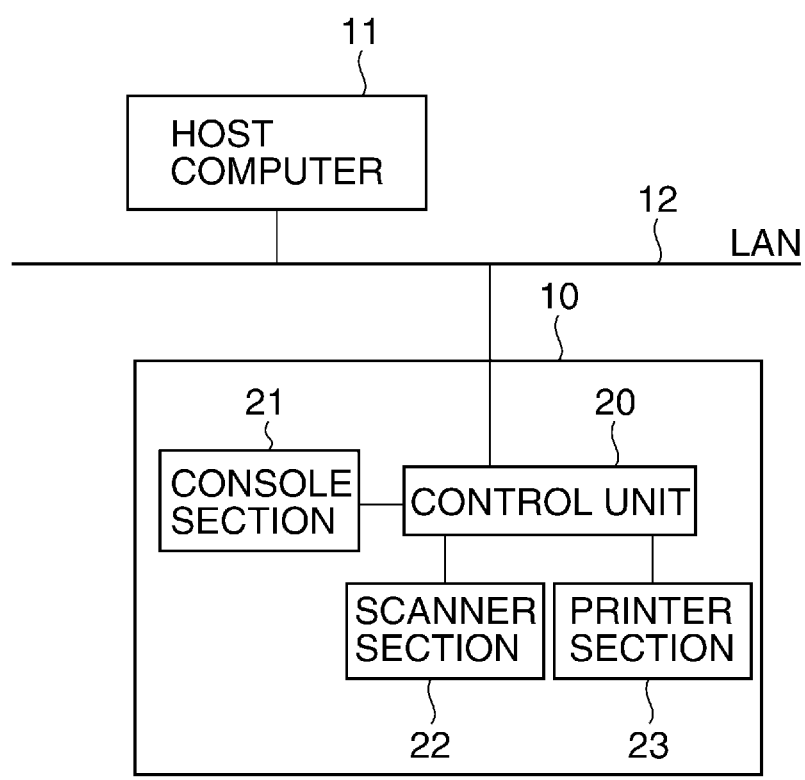
FIG. 1 is a block diagram of an image output system in which an image forming apparatus according to a first embodiment of the present invention is installed.

FIG. 1 is a block diagram of an image output system in which an image forming apparatus according to a first embodiment of the present invention is installed.

The illustrated image input system is configured such that a plurality of image forming apparatuses can communicate with each other via a LAN 12 using a predetermined protocol. Note that the present invention also applies to an image output system formed by combining at least one image forming apparatus and at least one information processing apparatus.

Referring to FIG. 1, the image forming apparatus, denoted by reference numeral 10, comprises a scanner section 22 that is an image input device, a printer section 23 that is an image output device, a control unit 20, and a console section 21 which is a user interface (UI).

A host computer 11 is an information processing apparatus that functions as a client machine, and includes a display device, a keyboard, a pointing device, and a computer main unit, none of which are shown. The host computer 11 has a function of executing various application programs by loading an operating system (OS) from an external storage device incorporated in the computer main unit into a RAM. Further, the host computer 11 has a function of acquiring information by communicating from a network card, not shown, with the image forming apparatus 10 via a network (the LAN 12 in the illustrated example), and displaying the acquired information.

The host computer 11 is configured to be capable of causing so-called Web browser software to operate thereon, and is configured to be capable of communicating with the image forming apparatus 10 that performs Web server function processing, described hereinafter, using a predetermined protocol. The host computer 11 is connected to the LAN 12.

In the image forming apparatus 10, the scanner section 22, the printer section 23, and the console section 21 are connected to the control unit 20. The control unit 20 is connected to the LAN 12.

Figure 2:
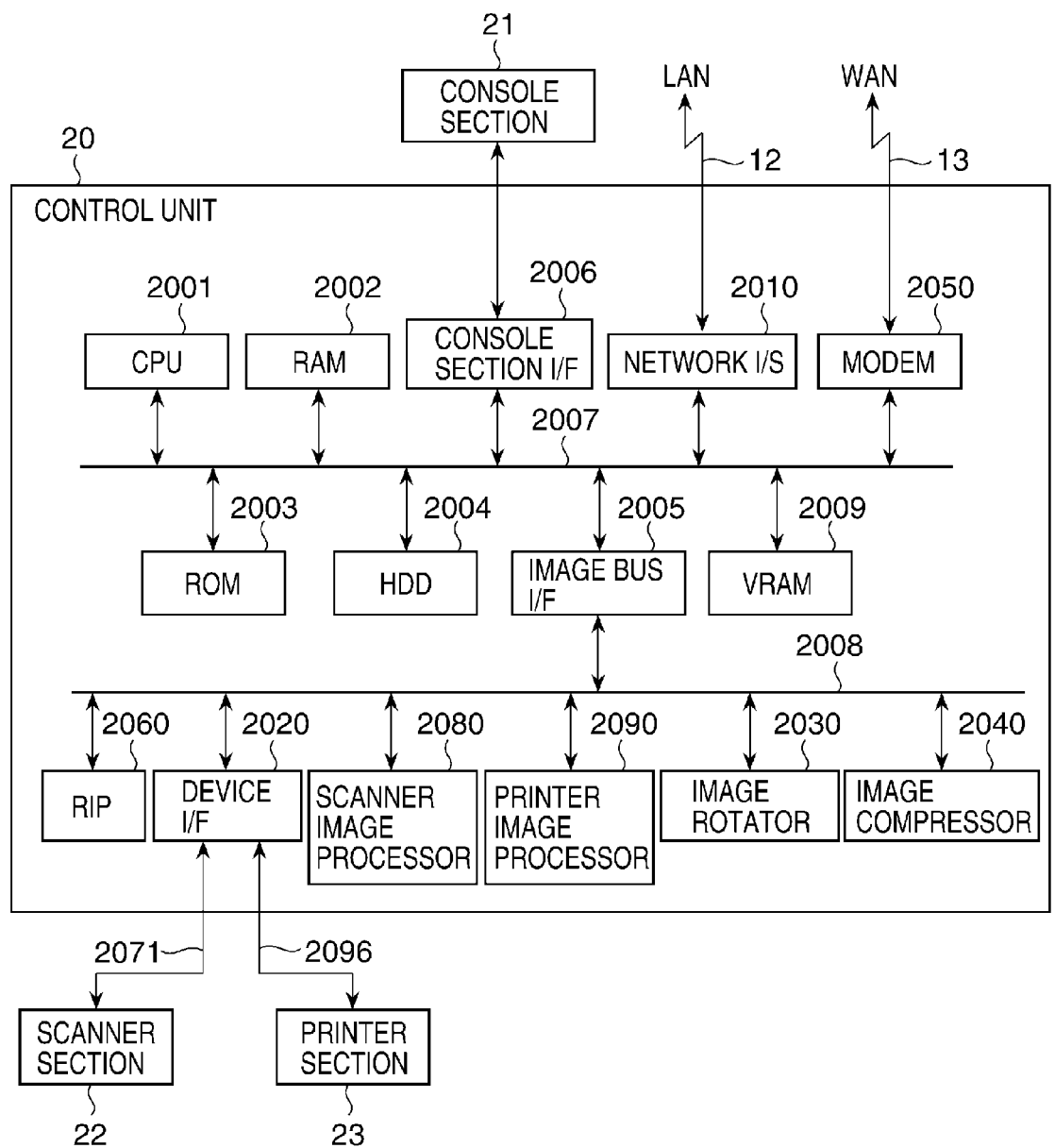
FIG. 2 is a schematic block diagram of a control unit appearing in FIG. 1.

FIG. 2 is a schematic block diagram of the control unit 20 appearing in FIG. 1.

Referring to FIG. 2, the control unit 20 is connected to the scanner section 22 which is an image input device and the printer section 23 which is an image output device. On the other hand, the control unit 20 is connected to the LAN 12 and a public communication line (WAN) 13 to thereby input and output image information and device information.

A CPU 2001 controls the overall operation of the image forming apparatus 10. A RAM 2002 serves as a system work memory for the operation of the CPU 2001, and also serves as an image memory for temporarily storing image data. A ROM 2003 functions as a boot ROM that stores a boot program for the system.

A hard disk drive (HDD) 2004 stores system software and image data. A console section interface 2006 functions as an interface section connected to the console section 21, and outputs image data to the console section 21 for display thereon. Further, the console section interface 2006 passes information input by a user via the console section 21 to the CPU 2001.

A VRAM 2009 is a memory that holds display screen data generated by the CPU 2001. The CPU 2001 generates image data which is processed so as to be displayed on the console section 21, based on display data acquired from the HDD 2004, and stores the generated image data in the VRAM 2009.

A network interface 2010 is connected to the LAN 12 to input and output data to and from external apparatuses including the host computer 11. A modem 2050 is connected to the public communication line 13 to receive and deliver data from and to external apparatuses, not shown. The above-described devices are connected to a system bus 2007.

An image bus interface 2005 is a bus bridge that connects between the system bus 2007 and an image bus 2008 used for high-speed transfer of image data, and converts data structure of the image data. The image bus 2008 is implemented by a PCI bus or an IEEE 1394 bus. Connected to the image bus 2008 are the following devices.

A raster image processor (RIP) 2060 rasterizes a PDL code into a bitmap image. A device interface 2020 connects between the scanner section 22 connected via an image input section interface 2071 and the printer section 23 connected via a printer section interface 2096, and the CPU 2001, and performs synchronous-to-asynchronous or asynchronous-to-synchronous conversion of image data.

A scanner image processor 2080 corrects, processes, and edits input image data. A printer image processor 2090 performs correction, resolution conversion, etc. of image data to be printed out, in a manner adapted to the printer.

An image rotator 2030 rotates image data. An image compressor 2040 performs JPEG compression and decompression on multi-valued image data, and JBIG, MMR, or MH-based compression and decompression on binary image data.

Figure 3:
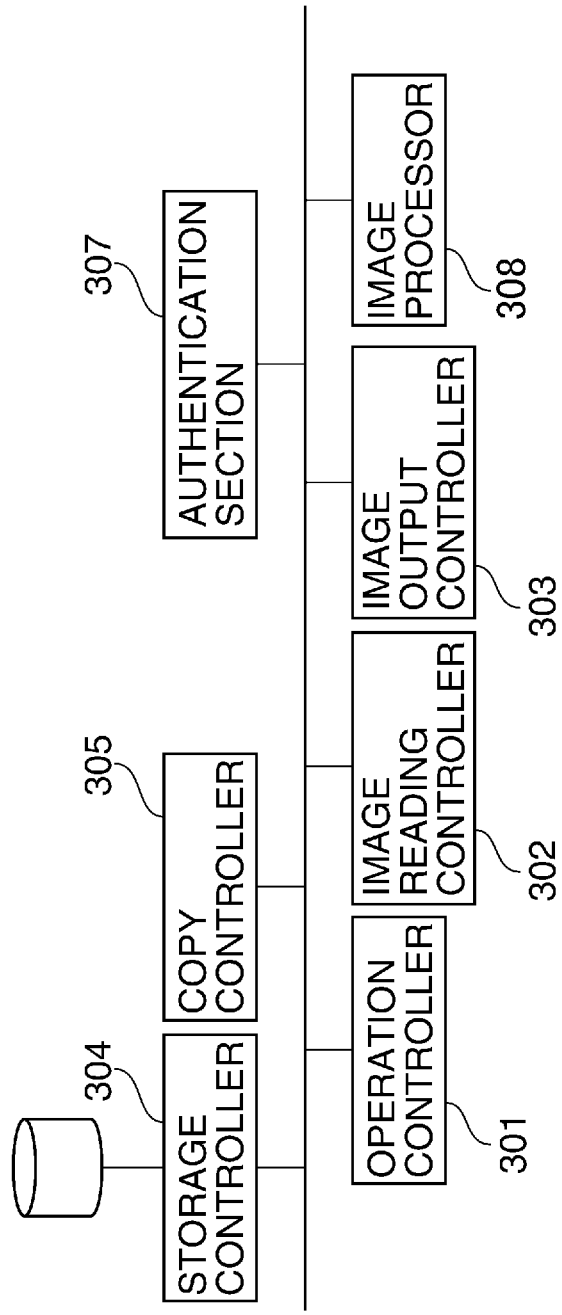
FIG. 3 is a block diagram of a software configuration of the image forming apparatus.

FIG. 3 is a block diagram of a software configuration of the image forming apparatus 10. Processing sections appearing in FIG. 3 are realized by the CPU 2001 that executes a program for controlling the image forming apparatus 10.

The following description will be given of operations of the processing sections appearing in FIG. 3 by taking an example of copy printing executed by the image forming apparatus 10.

The scanner section 22 appearing in FIG. 2 includes a platen and an automatic document feeder (ADF), neither of which is shown. When a user puts an original on the platen or on the ADF and presses a start key 402 (see FIG. 4) on the console section 21, the scanner section 22 optically reads the original placed on the platen or fed thereto from the ADF. In a case where the scanner section 22 reads a plurality of originals, when the platen is used, reading is continually executed by replacing one original set thereon with another, whereas when the ADF is used, reading is continually executed by sequentially feeding the originals from the ADF. Before this, the user can designate print settings concerning an output from the image forming apparatus 10, including page layout on a sheet, a finisher setting, such as stapling, and an image quality setting, such as density.

Referring to FIG. 3, an operation controller 301 displays on the console section 21 a screen and information necessary for operation thereof and receives information input by an operation of a user on the console section 21 to thereby determine which operation is instructed by the user. When the user requests copy printing, the operation controller 301 generates a screen necessary for copy printing, and instructs the console section 21 to display the generated screen. This causes the screen for copy printing to be displayed on the console section 21, and in response to this, the user sets an original on the platen or on the ADF, and instructs copying. Before this instruction, the user may designate the above-mentioned print settings. The copy instruction is passed from the console section 21 to the operation controller 301. The operation controller 301 determines that the received instruction is a copy instruction, and transfers the control to a copy controller 305.

It is required in the first place to read an image from the original, and hence the copy controller 305 instructs an image reading controller 302 to read the image. The image reading controller 302 controls the scanner section 22 via the device interface 2020 to read the image on the original set on the platen or fed from the ADF. Note that in a case where the original on the platen is replaced by another, the control is returned from the copy controller 305 to the operation controller 301, and the operation controller 301 displays again on the console section 21 a screen for prompting the user to select between reading the next original or starting printing. A storage controller 304 stores the data read by the scanner section 22 in the RAM 2002 or the HDD 2004 via the device interface 2020 and the system bus 2007. Note that in which of the RAM 2002 and the HDD 2004 the data is to be stored is determined by the image reading controller 302 depending on factors, such as data size and whether or not high-speed processing is required.

Next, it is required to output the read data, and hence the copy controller 305 instructs an image output controller 303 to print the image data stored in the RAM 2002 or the HDD 2004. The image output controller 303 instructs an image processor 308 to perform image processing on the data stored in the RAM 2002 or the HDD 2004 by the storage controller 304 according to the print settings designated by the user. Image processing is e.g. editing of an image to be output, such as laying out images on respective two originals on one sheet (2in1).

When editing of the image to be output is completed, the image processor 308 stores the edited image data in the RAM 2002 or the HDD 2004 by the storage controller 304.

The image output controller 303 reads the image data subjected to image processing from the RAM 2002 or the HDD 2004 by the storage controller 304, and transfers the data to the printer section 23 via the system bus 2007 and the device interface 2020. The printer section 23 sequentially prints out the received data onto sheets.

Next, an authentication section 307 that performs authentication will be described.

When a user uses the image forming apparatus 10, user authentication is sometimes required. For example, a screen for prompting the user to input a user name and a password is displayed on the console section 21, whereby the user is prompted to input the user name and the password. When the user name and password have been input, the user name and password input to the console section 21 are sent to the authentication section 307 via the console section interface 2006.

The authentication section 307 performs user authentication by referring to a user database stored e.g. in the HDD 2004 of the image forming apparatus 10, and checking whether or not the user database contains a combination of a user name and a password matching the input user name and password. Note that user authentication is not limited to this, but any other authentication method may be employed, such as one using a contactless IC card. Further, authentication information is not necessarily required to be locally held, but authentication may be performed using an external authentication server, as in the case of Active Directory (registered trademark of Microsoft). In such a case, the authentication section 307 makes an inquiry to the external authentication server.

Figure 4:
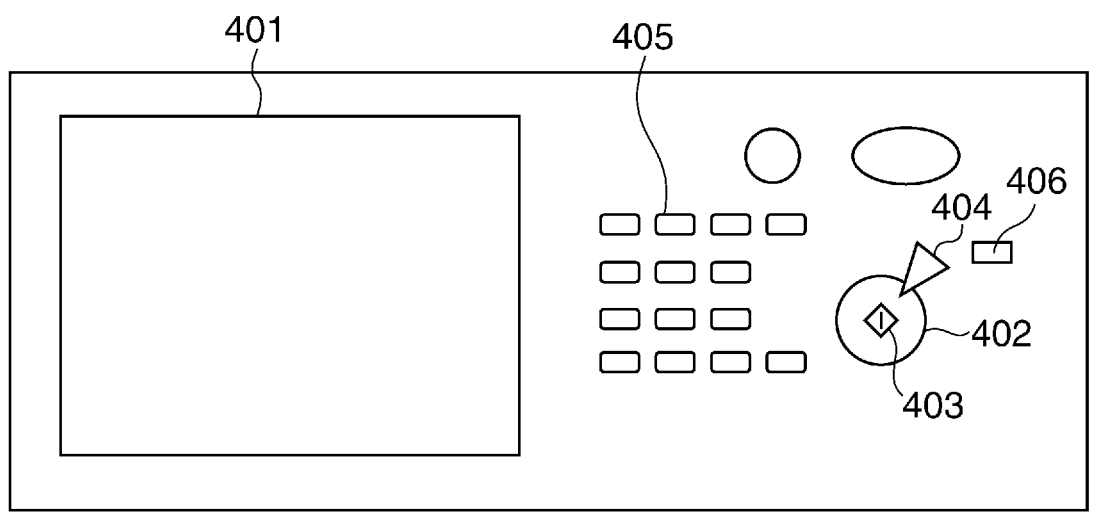
FIG. 4 is a schematic diagram of a console section.

FIG. 4 is a schematic diagram of the appearance of the console section 21.

A liquid crystal display section 401 has a touch panel sheet affixed on a liquid crystal, and displays a screen for operating the image forming apparatus 10 and soft keys. When a displayed key is pressed, the liquid crystal display section 401 notifies the CPU 2001 of location information of the pressed key.

The start key 402 is used e.g. when starting the operation for reading an image on an original (original image). The start key 402 has an LED 403, which has two colors (green and red), disposed on a central portion thereof, and the two colors each indicate whether or not the start key 402 is in a usable state. A stop key 404 has a function of stopping the operation being executed.

A numeric key pad 405 is formed by a button group including numeric buttons and character buttons, and is used for setting the number of copies, and providing an instruction for changing a screen on the liquid crystal display section 401. A user mode key 406 is pressed when configuring device settings.

Next, a description will be given of a change of the display screen on the liquid crystal display section 401 in a case where a job interrupt setting is made during the job setting operation in the image forming apparatus 10 with reference to FIGS. 5A to 5C.

Figure 5A:
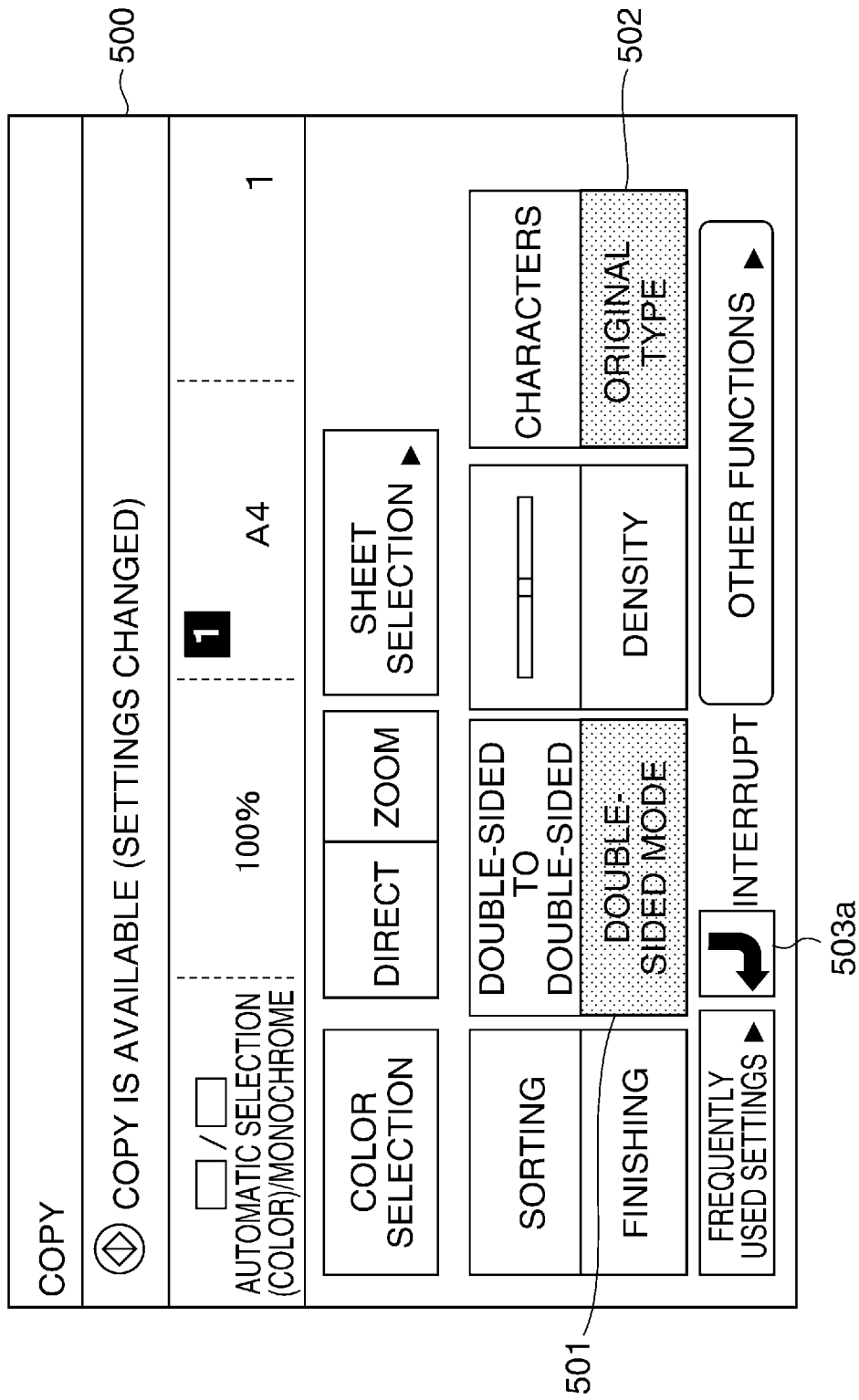
FIG. 5A is a diagram showing an example of a copy function-setting dialog.

FIG. 5A is a diagram showing an example of a copy function-setting dialog 500.

The user can designate the print settings concerning the output, including page layout on a sheet, a finisher setting, such as stapling, and an image quality setting, such as density, on the copy function-setting dialog 500 shown in FIG. 5A. In the example shown in FIG. 5A, keys (areas indicative thereof) selected and set are highlighted by reverse video. Note that description of modes which are not directly related to the present invention is omitted.

Referring to FIG. 5A, a double-sided key 501 is used for setting a double-sided mode. In the illustrated example, "double-sided to double-sided" of the double-sided mode is set. An original type key 502 is used for selecting an original type to which an original to be copied belongs, and changing image processing, with a view to reproducing an optimum image. In the illustrated example, "characters" indicative of an original type mode is set.

Pressing of the start key 402 in a state where an interrupt key 503 has been selected causes temporary interruption of a job e.g. under printing, and a copy operation is executed in a copy mode which has been newly set. Further, after completion of the interruption copying, the printing operation being executed before the interruption copying can be automatically resumed. In the example of the screen shown in FIG. 5A, the interrupt key 503 is in an unselected state.

Figure 5B:
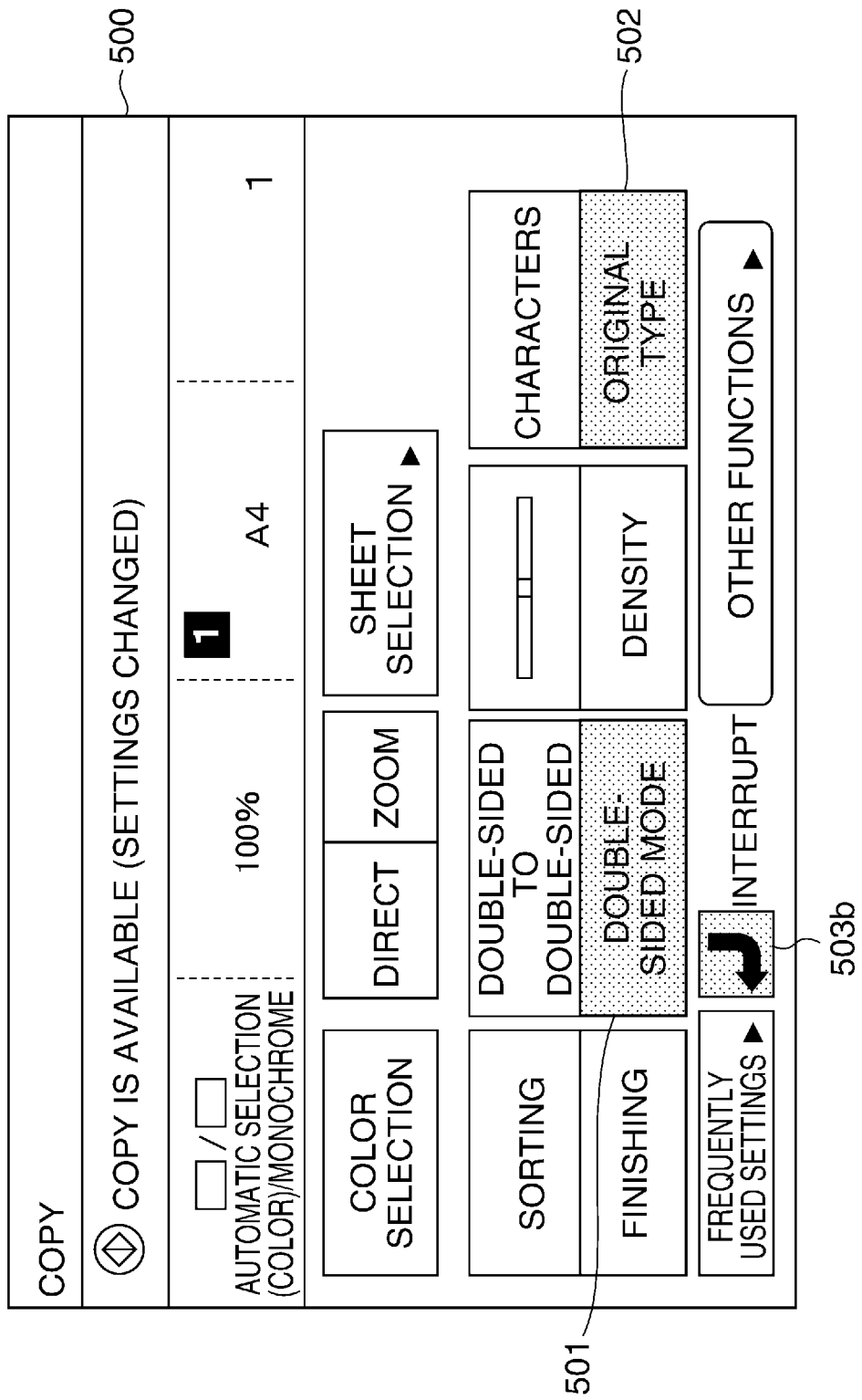
FIG. 5B is a diagram showing an example of the copy function-setting dialog in a state where an interrupt setting has been made.

FIG. 5B is a diagram showing an example of the copy function-setting dialog in a state where the interrupt key 503 has been selected on the copy function-setting dialog 500 shown in FIG. 5A, and the interrupt setting has been made.

When the interrupt key 503 is selected, the job settings set when the interrupt key 503 was in the unselected state and the display screen displayed on the liquid crystal display section 401 at that time are stored in the HDD 2004 as the job settings before interruption. In the example of the screen shown in FIG. 5B, "double-sided to double-sided" of the double-sided mode and "characters" of the original type mode are stored in the HDD 2004 as the job settings before interruption. Further, the copy function-setting dialog 500 is stored in the HDD 2004 as the display screen before interruption.

Figure 5C:
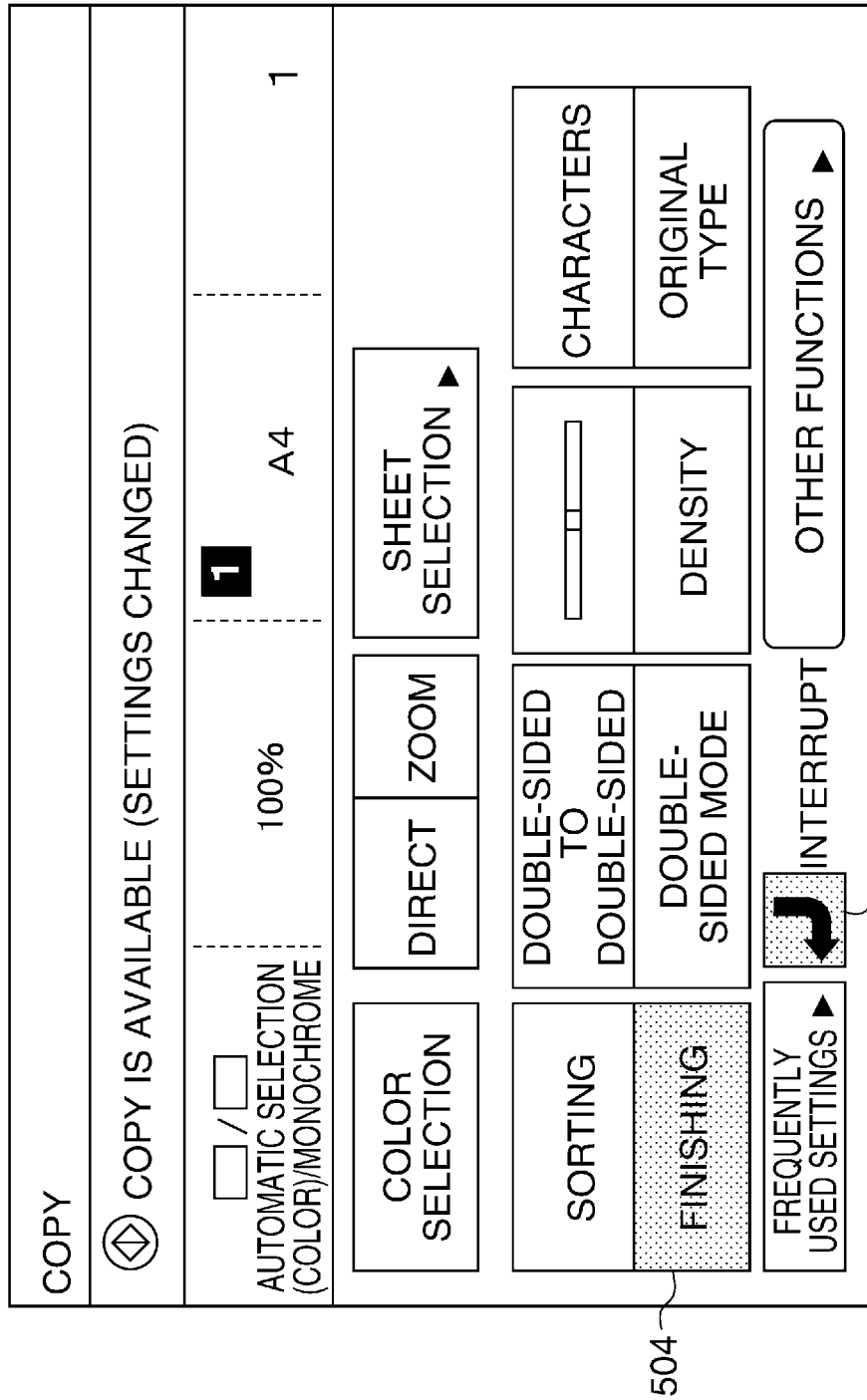
FIG. 5C is a diagram showing an example of the copy function-setting dialog in a state where job settings have been made after making the interrupt setting.

FIG. 5C is a diagram showing an example of the copy function-setting dialog 500 in a state where the job settings have been made after making the interrupt setting.

A finisher key 504 is used for setting a sorting mode and a staple mode. The double-sided mode set by the double-sided key 501 is canceled, and the double-sided key 501 is in the unselected state. Further, the original type mode set by the original type key 502 is canceled, and the original type key 502 is in the unselected state. In the example of the screen shown in FIG. 5C, the finisher mode is set to sorting as a job setting made after making the interrupt setting.

Although in the examples of the screen shown in FIGS. 5A to 5C, the description has been given of the case where the interrupt key 503 is provided in the liquid crystal display section 401, the same can be applied to a case where a hard key for this purpose is provided outside the screen, or an interrupt setting is made by another operation.

Figure 6:
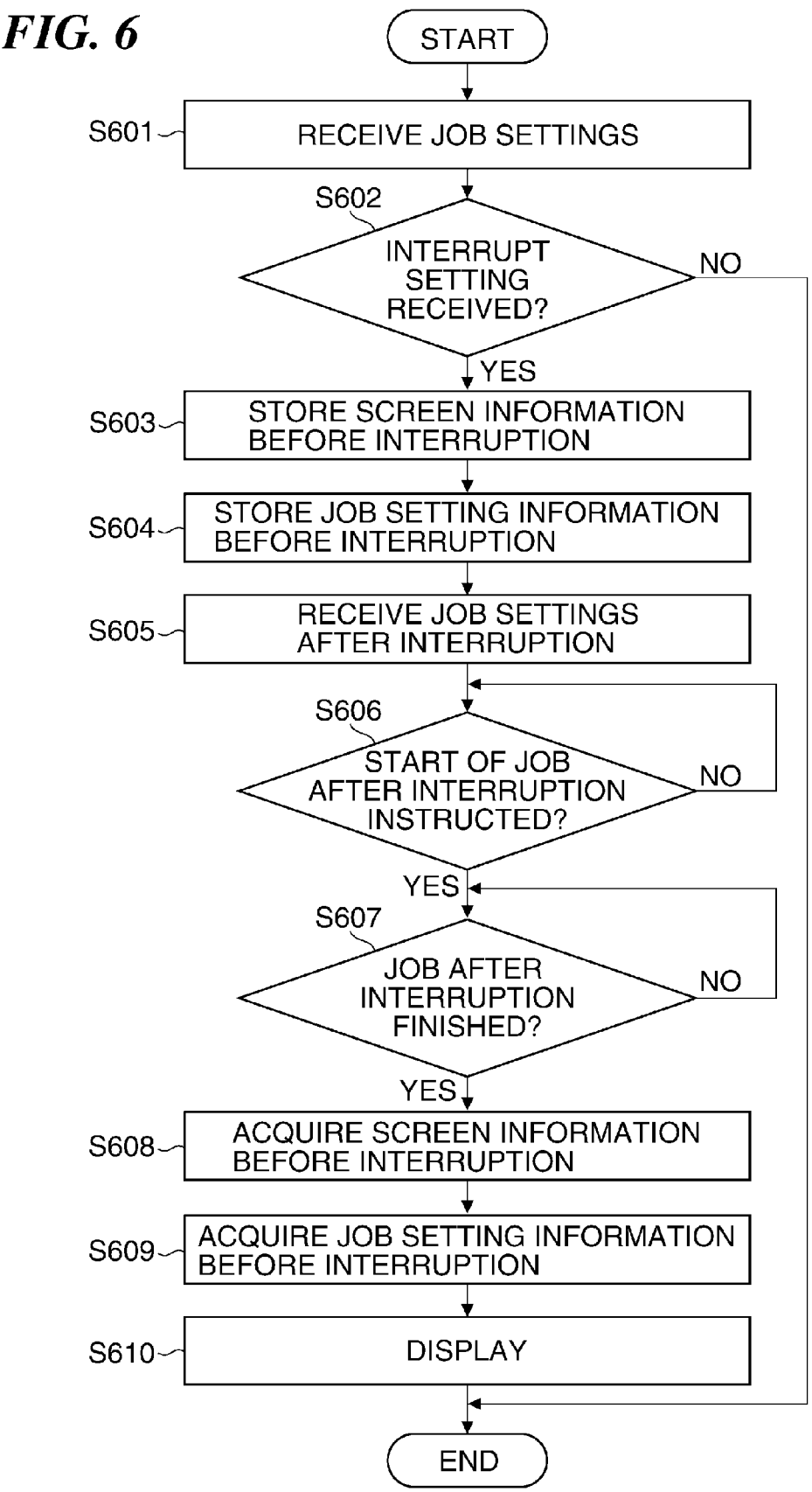
FIG. 6 is a flowchart of an interrupt job-setting process performed in a case where a job interrupt setting is made during a job setting operation.

FIG. 6 is a flowchart of an interrupt job-setting process performed in a case where a job interrupt setting is made during a job setting operation. Steps of the interrupt job-setting process are realized by the CPU 2001 of the image forming apparatus 10, which executes a control program.

The image forming apparatus 10 is in a state capable of receiving job settings from the console section 21. In a step S601, the CPU 2001 receives settings of a job on the console section 21. In the present embodiment, the description is given assuming that a copy job is received on the copy function-setting dialog 500, shown in FIG. 5A. In the example of the screen shown in FIG. 5A, the settings of "double-sided to double-sided" of the double-sided mode and "characters" of the original type mode are received as the job settings before interruption.

Next, in a step S602, the CPU 2001 determines whether or not an interrupt setting for interrupting the job setting operation has been received. In this step, the CPU 2001 determines whether or not the interrupt key 503 appearing in FIG. 5A has been selected to change the interrupt key 503 from the state shown in FIG. 5A to the state shown in FIG. 5B.

If it is determined in the step S602 that an interrupt setting has been received, the CPU 2001 proceeds to a step S603. On the other hand, if it is determined that the interrupt setting has not been received, the present process is immediately terminated.

In the step S603, the CPU 2001 stores screen information displayed on the liquid crystal display section 401 at a time point when a cause of interruption is generated, i.e. when the interrupt key 503 has been selected, in the HDD 2004, as the screen information before interruption. For example, the screen information, shown in FIG. 5A, is stored.

Next, in a step S604, the CPU 2001 stores information on the job settings already set at a time point when the interrupt key 503 has been selected, in the HDD 2004, as the job setting information before interruption. In the example of the screen, shown in FIG. 5B, the settings of "double-sided to double-sided" of the double-sided mode and "characters" of the original type mode are stored.

In a step S605, the CPU 2001 receives job settings after interruption which are entered in the selected state of the interrupt key 503. In the example of the screen, shown in FIG. 5C, a setting of "sorting" is received for the finisher mode as one of job settings after interruption.

In a step S606, the CPU 2001 determines whether or not a job start instruction based on the job settings after interruption, received in the step S605 has been received. The receipt of the job start instruction is determined depending on whether or not the start key 402 is pressed by the user's operation.

If it is determined in the step S606 that a job start instruction based on the job settings after interruption has been received, the CPU 2001 proceeds to a step S607. On the other hand, if it is determined that a job start instruction based on the job settings after interruption has not been received, the CPU 2001 repeats the step S606 until the job start instruction based on the job settings after interruption is received.

In the step S607, the CPU 2001 determines whether or not the job based on the job settings after interruption, which is executed upon receipt of the instruction for starting the same in the step S606, has been finished.

If it is determined in the step S607 that execution of the job based on the job settings after interruption has been finished, the CPU 2001 proceeds to a step S608. On the other hand, if execution of the job based on the job settings after interruption has not been finished, the CPU 2001 repeats the step S607 until it is finished.

In the step S608, the CPU 2001 acquires the screen information before interruption from the HDD 2004, which has been stored in the HDD 2004 in the step S603.

Next, in a step S609, the CPU 2001 acquires the job setting information before interruption from the HDD 2004, which has been stored in the HDD 2004 in the step S604.

In a step S610, the CPU 2001 displays the screen information before interruption acquired in the step S608 and the job setting information before interruption acquired in the step S609, on the liquid crystal display section 401, followed by terminating the present process.

According to the above-described first embodiment, in a case where a cause of interruption of the job setting operation is generated at a timing other than the predetermined timing, the information of the displayed screen and the job setting information are stored. Then, when the interrupt job is finished and the interruption is thereby removed, the stored screen information and job setting information are read out to reproduce the interrupted state of the job setting operation. This makes it possible to properly reproduce the settings desired by the user even when the setting operation is interrupted by a cause which is not intended by the user, and thereby improve user-friendliness.

Next, a description will be given of a second embodiment of the present invention. The second embodiment is the same as the first embodiment in the configuration of the image output system and that the image forming apparatus described hereinbefore with reference to in FIGS. 1 to 5C. Therefore, the same components as those of the first embodiment are denoted by the same reference numerals, and description thereof is omitted. The following description is given mainly of different points.

Figure 7:
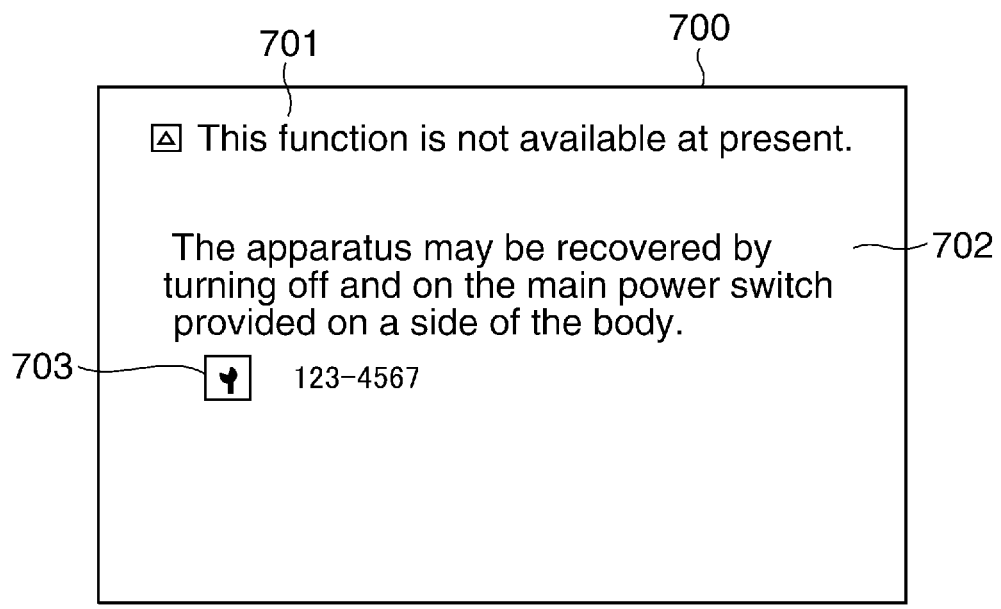
FIG. 7 is a diagram showing an example of an error dialog screen displayed by an image forming apparatus according to a second embodiment of the present invention, in a case where an error occurs during a job setting operation.

FIG. 7 is a diagram showing an example of an error dialog screen displayed in a case where an error occurs in the image forming apparatus according to the second embodiment during a job setting operation.

An error dialog 700 is an example of a dialog displayed on the liquid crystal display section 401 when processing cannot be continued e.g. due to a failure of the apparatus. An error information display area 701 is an area for displaying an error type icon and a message. The illustrated example of the screen indicates that the function being used at the occurrence of the error is currently unavailable. In a case where the screen, shown in FIG. 7, is displayed in a state in which the copy function-setting dialog, shown in FIGS. 5A to 5C, is displayed, the error dialog indicates that an error related to the copy function has occurred, and the copy function is not available. A supplemental message display area 702 is an area for displaying a supplemental message which is necessary for the user to remove the error. The illustrated example of the screen indicates that the error will be removed by turning off and on the power of the apparatus. An error code display area 703 is an area for displaying the error type icon and an error code.

A description will be given of a case where in the course of a job setting operation via the copy function dialog, shown in FIGS. 5A and 5B, there has occurred an error interrupting the job setting operation.

Figure 8:
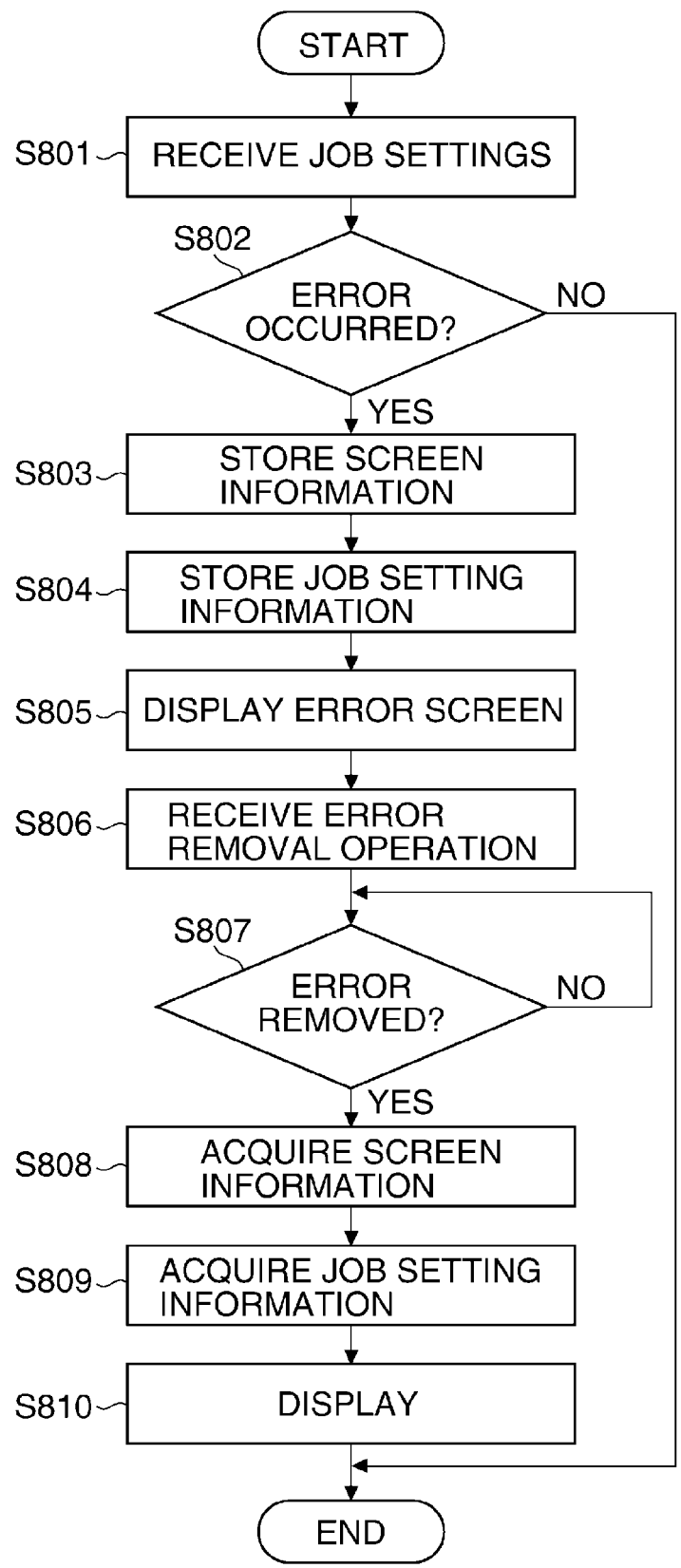
FIG. 8 is a flowchart of an error handling process performed when the setting operation is interrupted due to occurrence of an error in the course of the job setting operation.

FIG. 8 is a flowchart of an error handling process performed when the job setting operation is interrupted due to occurrence of an error in the course thereof. Steps in the error handling process shown in FIG. 8 are realized by the CPU 2001 of the image forming apparatus 10, which executes the control program.

The image forming apparatus 10 is in a state capable of receiving job settings from the console section 21. In a step S801, the CPU 2001 receives job settings input from the console section 21. In the present embodiment, the description is given assuming that the job settings on the copy function-setting dialog 500, shown in FIG. 5A, are received.

Next, in a step S802, the CPU 2001 determines whether or not an error which interrupts the job setting operation has occurred. Examples of the error mentioned in this step include a case where a function related to the scan operation has become inoperable due to a failure or connection abnormality, or a case where a function related to the printing operation has become inoperable due to a failure or connection abnormality. Further, the errors further include a case where processing is interrupted due to occurrence of abnormality in network communication.

If it is determined in the step S802 that an error which interrupts the job setting operation has occurred, the CPU 2001 proceeds to a step S803. On the other hand, if it is determined that an error which interrupts the job setting operation has not occurred, the present process is immediately terminated.

In the step S803, the CPU 2001 stores information on the screen in the HDD 2004, displayed on the liquid crystal display section 401 at a time point when the cause of interruption has been generated, i.e. the error has occurred. For example, the information on the screen, shown in FIG. 5A, is stored.

In a step S804, the CPU 2001 stores information on the job settings in the HDD 2004, set at the time point when the error has occurred. In the example of the screen, shown in FIG. 5B, the settings of "double-sided to double-sided" of the double-sided mode and "characters" of the original type mode are stored.

Next, in a step S805, the CPU 2001 displays the error dialog 700, shown in FIG. 7, on the liquid crystal display section 401.

In a step S806, the CPU 2001 receives an error removal operation from the user, which is performed according to the supplemental explanation in the supplemental message display area 702 of the error dialog 700 displayed in the step S805. In the example of the screen shown in FIG. 7, the operation for turning off and on the power of the apparatus is received.

In a step S807, the CPU 2001 determines whether or not the error having occurred has been removed by the error removal operation received in the step S806. If it is determined in the step S807 that the error has been removed, the CPU 2001 proceeds to a step S808. On the other hand, if it is determined in the step S807 that the error has not been removed, the CPU 2001 repeats the step S807 until the error is reset.

In the step S808, the CPU 2001 acquires the screen information from the HDD 2004, which was stored in the HDD 2004 in the step S803 when the error occurred.

Next, in a step S809, the CPU 2001 acquires the job setting information from the HDD 2004, which was stored in the HDD 2004 in the step S804 when the error occurred.

In a step S810, the CPU 2001 displays the screen information at the time of occurrence of the error, which has been acquired in the step S808, and the job setting information at the time of occurrence of the error, which has been acquired in the step S809, on the liquid crystal display section 401, followed by terminating the present process.

Although in the above-described second embodiment, the description has been given of the example in which an error is removed by turning off and on the power, the method of removing an error is not limited to this.

According to the second embodiment, it is determined whether or not an error has occurred which interrupts the job setting operation, and if an error has occurred, similarly to the first embodiment, the information on the screen displayed at the time of occurrence of the error and the job setting information at the time of occurrence of the error are stored. Then, when the error is removed, the stored screen information and job setting information are read out, and the interrupted state of the job setting operation is reproduced. This makes it possible to obtain the same advantageous effects as provided by the first embodiment.

Next, a description will be given of a third embodiment of the present invention. The second embodiment is the same as the first embodiment in the configuration of the image output system and that the image forming apparatus described hereinbefore with reference to in FIGS. 1 to 5C. Therefore, the same components as those of the first embodiment are denoted by the same reference numerals, and description thereof is omitted. The following description is given mainly of different points from the first and second embodiments. In the above-described first and second embodiments, the description has been given of the case where a cause of interruption of a job setting operation occurs in the course thereof before inputting the job.

In the third embodiment, a case where a cause of interruption is generated during execution of a job will be described. For example, in a case where another user who urgently needs to perform copying inputs an interrupt during execution of copying of a large amount of sheets, the scan or printing operation is temporarily interrupted, and the interrupt job is executed. Then, after completion of the interrupt job, the scan or printing operation before the interrupt is resumed from the temporarily stopped state. A user interrupt handling process performed in such a case will be described with reference to FIGS. 9A and 9B.

Figures 9B, 10:
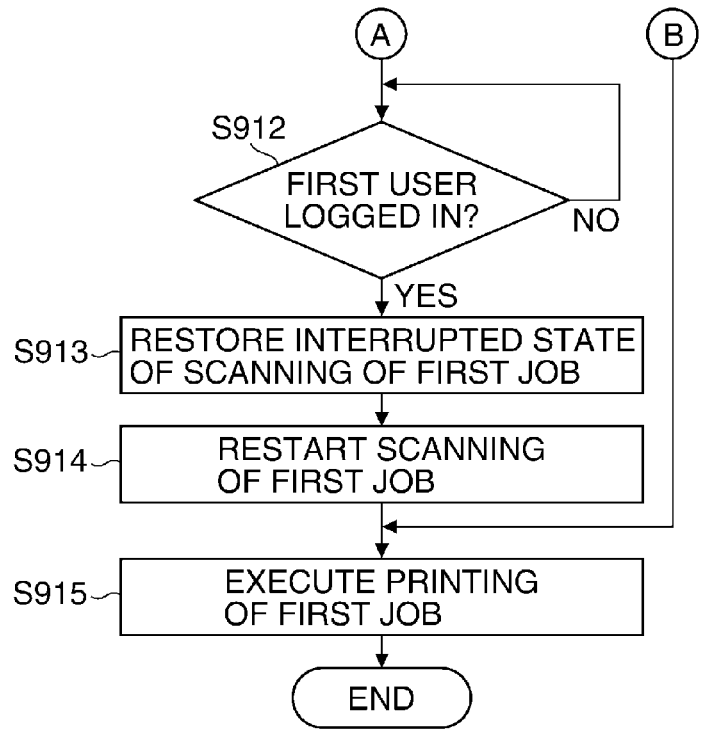
FIG. 9B is a continuation of FIG. 9A.
FIG. 10 is a diagram showing an example of a table of screen information, job setting information, and scanned image data, which is stored in an HDD in association with each logged-in user.

FIGS. 9A and 9B are a flowchart of the user interrupt handling process performed when an interrupt is generated by another user during execution of a job by the image forming apparatus 10 according to the third embodiment. Steps in the user interrupt handling process are realized by the CPU 2001 of the image forming apparatus 10 which executes the control program.

The image forming apparatus 10 is in a state having a first user logged in and capable of receiving job settings from the liquid crystal display section 401. In FIG. 9A, in a step S901, the CPU 2001 receives settings of a first job input by the operation of the first user on the copy function-setting dialog 500 shown in FIG. 5A.

Next, in a step S902, the start key 402 is pressed by the first user's operation, and the CPU 2001 receives an instruction for starting the first job.

In a step S903, the CPU 2001 controls the scanner section 22 to execute a scan operation of the first job.

In a step S904, the CPU 2001 determines whether or not the first user has performed the logout operation during execution of the scan operation in the step S903. If it is determined in the step S904 that the first user has logged out during execution of the scan operation, the CPU 2001 proceeds to a step S905. On the other hand, if it is determined in the step S904 that the first user has not logged out during execution of the scan operation, the CPU 2001 proceeds to a step S915 in FIG. 9B.

In the step S905, the CPU 2001 temporarily interrupts the scan operation of the first job, and stores information on settings in this state in the HDD 2004 in association with information on authentication of the first user performed by the authentication section 307. Here, the setting information (information on the settings) and the authentication information (information on the authentication) stored in the HDD 2004 will be described with reference to FIG. 10.

Referring to FIG. 10, reference numeral 1000 denotes a table which is stored in the HDD 2004 when an interrupt is generated by another user during execution of the job of the image forming apparatus 10. In the table, the display screen, the job settings, and the scanned image data are associated with the user authenticated by the authentication section 307. For example, in a case where the first user who has logged out is "user002", the CPU 2001 refers to a storage area 1001 of the user "user002" in the table 1000. Then, the CPU 2001 stores the information on the display screen displayed when the scan operation has been temporarily interrupted in a display screen storage area 1002 of the user "user002", and stores the information of the job settings in a job setting storage area 1003 of the user "user002".

Further, the CPU 2001 stores information on the scanned image data obtained by scanning before the interruption of the scan operation in a scanned image data storage area 1004 of the user "user002".

In FIG. 9A, in a step S906, the CPU 2001 determines whether or not a second user has performed the login operation. If it is determined in the step S906 that the second user has performed the login operation, the CPU 2001 proceeds to a step S907. On the other hand, if it is determined that the second user has not performed the login operation for a predetermined time period, the CPU 2001 proceeds to the step S915 in FIG. 9B.

In the step S907, the CPU 2001 receives settings of a second job input by the operation of the second user on the copy function-setting dialog 500 shown in FIG. 5A.

Next, in a step S908, the start key 402 is pressed by the second user's operation, and the CPU 2001 receives an instruction for starting the second job.

In a step S909, the CPU 2001 controls the scanner section 22 to execute the scan operation of the second job.

In a step S910, the CPU 2001 controls the printer section 23 to execute the printing operation of the second job.

Next, in a step S911, the CPU 2001 determines whether or not the second user has performed the logout operation after completion of the printing operation in the step S910. If it is determined in the step S911 that the second user has performed the logout operation, the CPU 2001 proceeds to a step S912 in FIG. 9B. On the other hand, if it is determined that the second user has not performed the logout operation, the CPU 2001 repeats the step S911 until the logout operation is performed.

In FIG. 9B, in the step S912, the CPU 2001 determines whether or not the first user has performed the login operation. If it is determined in the step S912 that the first user has performed the login operation, the CPU 2001 proceeds to a step S913. On the other hand, if it is determined that the first user has not performed the login operation, the CPU 2001 repeats the step S912 until the login operation is performed.

In the step S913, the CPU 2001 reproduces the interrupted state of the scan operation of the first job, which was stored in the step S905. For example, when the first user is "user002", the CPU 2001 refers to the storage area 1001 of the user "user002" in the table 1000. Then, the CPU 2001 acquires the information on the display screen stored in the display screen storage area 1002 of the user "user002", acquires the information on the job settings stored in the job setting storage area 1003 of the user "user002", and displays the acquired information on the liquid crystal display section 401. Further, the CPU 2001 acquires the information on the scanned image data stored in the scanned image data storage area 1004 of the user "user002".

In a step S914, the CPU 2001 controls the scanner section 22 to resume the scan operation of the first job in a manner continued from the interrupted state of the scan operation of the first job which has been reproduced in the step S913.

In the step S915, the CPU 2001 controls the printer section 23 to execute the printing operation of the first job, followed by terminating the present process.

According to the third embodiment, even when a cause of interruption is generated during execution of a job, the settings and screen in the interrupted state are stored, and when the interruption is removed, the interrupted state of the job setting operation is reproduced. As a consequence, even when a job being executed is interrupted by a cause which is not intended by a user, it is possible to properly reproduce the settings desired by the user, and thereby improve user-friendliness.

Although in the first to third embodiments, the description has been given of storage and reproduction of the setting information at a time point when the operation for setting the copy function is interrupted, the function is not limited to the copy function, but the same is applied to any other functions, such as a send function and a box function.

Further, when a cause of interruption of the job setting operation is not removed even when a predetermined time period has elapsed, the screen information and the job setting information, stored when the cause of interruption of the job setting operation has been generated, may be discarded.

In the first to third embodiments, the description has been given of a method of storing, in a case where a cause of interruption of a setting operation is generated at a timing other than a predetermined timing, screen information being displayed and job settings being halfway made at the time of generation of the cause, and reproducing the stored screen information and job settings when the cause of interruption is removed. With this method, when a cause which is not intended by a user is generated, the user can continue the job setting operation from a state immediately before generation of the cause of interruption without wastefully performing an operation for configuring the settings again.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-182980 filed Sep. 4, 2013, which is hereby incorporated by reference herein in its entirety.

What is claimed is:

1. A job processing apparatus comprising:
   a storage device; and
   a processor configured to execute computer executable instructions recorded on the storage device, the computer executable instructions including instructions, that when executed by the processor, cause the job processing apparatus to:
   display a setting screen of a copy job, the copy job being a job of performing printing based on image data generated by reading out an image;
   receive from a user settings of the copy job via the setting screen;
   receive from a user an instruction of inputting settings of another copy job different from the copy job during receipt of the settings of the copy job;
   hold screen information of the setting screen being displayed when the instruction is received; and
   display the setting screen based on the held screen information according to execution of the another copy job having been completed such that the setting screen being displayed at the time of receipt of the instruction is reproduced.

2. The job processing apparatus according to claim 1, wherein the computer executable instructions further include instructions, that when executed by the processor, cause the job processing apparatus to determine whether the instruction has been received, and
wherein the screen information of the displayed setting screen is held when it is determined that the instruction has been received.

3. The job processing apparatus according to claim 1, wherein the computer executable instructions further include instructions, that when executed by the processor, cause the job processing apparatus to delete, in a case where the execution of the another copy job is not completed even if a predetermined time period has elapsed after the instruction has been received, the held screen information.

4. A method of controlling a job processing apparatus, comprising:
   displaying a setting screen of a copy job, the copy job being a job of performing printing based on image data generated by reading out image;
   receiving from a user settings of the copy job via the setting screen;
   receiving from a user an instruction of inputting settings of another copy job different from the copy job during receipt of the settings of the copy job;
   holding screen information of the setting screen being displayed when the instruction is received; and
   displaying the setting screen based on the held screen information according to execution of the another copy job having been completed such that the setting screen being displayed at the time of receipt of the instruction is reproduced.

5. A non-transitory computer-readable storage medium storing a computer-executable program for executing a method of controlling a job processing apparatus,
   wherein the method comprises:
   displaying a setting screen of a copy job, the copy job being a job of performing printing based on image data generated by reading out image;
   receiving from a user settings of the copy job via the setting screen;
   receiving from a user an instruction of inputting settings of another copy job different from the copy job during receipt of the settings of the copy job;
   holding screen information of the setting screen being displayed when the instruction is received; and
   displaying the setting screen based on the held screen information according to execution of the another copy job having been completed such that the setting screen being displayed at the time of receipt of the instruction is reproduced.

6. The job processing apparatus according to claim 1, wherein the computer executable instructions further include instructions, that when executed by the processor, cause the job processing apparatus to execute the copy job based on the settings of the copy job.

7. The job processing apparatus according to claim 1, wherein the computer executable instructions further include instructions, that when executed by the processor, cause the job processing apparatus to hold the received settings of the copy job, and
   wherein the setting screen is displayed based on the held settings of the copy job and the held screen information, according to the execution of the another copy job having been completed.

8. The job processing apparatus according to claim 1, wherein the computer executable instructions further include instructions, that when executed by the processor, cause the job processing apparatus to determine whether the execution of the another copy job has been completed, and
   wherein the setting screen is displayed based on the held screen information according to the determination that the execution of the another copy job has been completed.

9. The job processing apparatus according to claim 1, wherein the computer executable instructions further include instructions, that when executed by the processor, cause the job processing apparatus to read out an image of an original to generate the image data, and to print the image on a sheet based on the image data, and
   wherein the copy job is a job of printing the image on the sheet based on the image data generated by reading out the image of the original.

10. A job processing apparatus comprising:
    a storage device; and
    a processor configured to execute computer executable instructions recorded on the storage device, the computer executable instructions including instructions, that when executed by the processor, cause the job processing apparatus to:
    display a setting screen of a send job;
    receive settings of the send job from a user via the setting screen;
    receive from a user an instruction of inputting settings of another send job different from the send job during receipt of the settings of the send job;
    hold screen information of the setting screen being displayed when the instruction is received; and
    display the setting screen based on the held screen information according to execution of the another send job having been completed such that the setting screen being displayed at the time of receipt of the instruction is reproduced.

11. The job processing apparatus according to claim 10, wherein the computer executable instructions further include instructions, that when executed by the processor, cause the job processing apparatus to hold the received settings of the send job, and
    wherein the setting screen is displayed based on the held settings of the send job and the held screen information, according to the execution of the another send job having been completed.

12. The job processing apparatus according to claim 10, wherein the computer executable instructions further include instructions, that when executed by the processor, cause the job processing apparatus to execute the send job based on the settings of the send job.

13. The job processing apparatus according to claim 10, wherein the computer executable instructions further include instructions, that when executed by the processor, cause the job processing apparatus to delete, in a case where the execution of the another send job is not completed even if a predetermined time period has elapsed after the instruction has been received, the held screen information.

14. The job processing apparatus according to claim 10, wherein the computer executable instructions further include instructions, that when executed by the processor, cause the job processing apparatus to determine whether the instruction has been received, and
    wherein the screen information of the displayed setting screen is held when it is determined that the instruction has been received.

15. The job processing apparatus according to claim 10, wherein the computer executable instructions further include instructions, that when executed by the processor, cause the job processing apparatus to determine whether the execution of the another send job has been completed, and
    wherein the setting screen is displayed based on the held screen information according to the determination that the execution of the another send job has been completed.

16. The job processing apparatus according to claim 10, wherein the computer executable instructions further include instructions, that when executed by the processor, cause the job processing apparatus to read out an image of an original to generate image data, and to send the image data to an external device via a network, and
    wherein the send job is a job of sending the image data to the external device, the image data being generated by reading out the image of the original.

* * * * *